(12) United States Patent
Jones

(10) Patent No.: US 7,985,048 B2
(45) Date of Patent: Jul. 26, 2011

(54) FOLDING ROTOR FOR AN AUTOGYRO DEVICE

(75) Inventor: Richard D. Jones, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 973 days.

(21) Appl. No.: 11/860,991

(22) Filed: Sep. 25, 2007

(65) Prior Publication Data
US 2009/0081043 A1 Mar. 26, 2009

(51) Int. Cl.
*B64C 11/28* (2006.01)

(52) U.S. Cl. .................. 416/87; 416/88; 416/142; 416/1

(58) Field of Classification Search ................ 416/1, 87, 416/88, 142, 143
See application file for complete search history.

(56) References Cited

U.S. PATENT DOCUMENTS

| | | | | |
|---|---|---|---|---|
| 2,120,168 A * | 6/1938 | Ash, Jr. | | 416/88 |
| 2,602,614 A * | 7/1952 | Cole | | 244/123.9 |
| 2,996,121 A * | 8/1961 | Stub | | 416/88 |
| 3,666,210 A * | 5/1972 | Look et al. | | 244/218 |
| 3,750,982 A * | 8/1973 | Gear | | 244/17.11 |
| 3,838,940 A | 10/1974 | Hollrock | | |
| 4,017,043 A | 4/1977 | Barzda | | |
| 4,071,206 A * | 1/1978 | Magill | | 244/17.11 |
| 4,131,392 A | 12/1978 | Barzda | | |
| 5,074,753 A * | 12/1991 | Covington et al. | | 416/141 |
| 7,090,550 B2 * | 8/2006 | Wilkie | | 440/49 |

* cited by examiner

*Primary Examiner* — Ninh H Nguyen

(74) *Attorney, Agent, or Firm* — Klintworth & Rozenblat IP LLC

(57) ABSTRACT

In one embodiment, a folding rotor blade for an autogyro device comprises a plurality of connected rotor members. When the folding rotor blade is in a compressed state the folding rotor blade has a compressed length, and some of the connected rotor members are disposed in a non-parallel arrangement. When the folding rotor blade is in an extended state the folding rotor blade has an extended length, which is greater than the compressed length, and the connected rotor members are disposed in a parallel arrangement.

25 Claims, 7 Drawing Sheets

FOLDING ROTOR FOR AN AUTOGYRO DEVICE

BACKGROUND

It is beneficial to be able to fold the rotor blade of an autogyro device for storage and transport purposes. Some of the existing folding rotor blades may be folded at the hub to which they are connected, thus reducing the rotor blade diameter by only one-half, but not more. These folding rotor blades are often highly complex and may add considerable weight to the autogyro device. Other folding rotor blades may utilize telescopic rotor blades. However these rotor blades may require that the telescopic segments fit within one another. This type of design may not tolerate the aerodynamic bending forces generated in a rotor. Moreover, this type of design may require a complex internal mechanism, and may make it difficult to maintain rotor balance during deployment and stowage of the rotor blade which may require the rotor to be stopped. As a result, centrifugal force to power the deployment of the rotor blade may not be used. Other designs may utilize complex rotor blades which may require manual removal of bolts, may require manual folding of the rotor blade, may add significant drag to the rotor blade, and/or may reduce performance. Other types of folding rotor blades may experience varying types of problems.

A folding rotor blade, and a method of deployment thereof, is needed to decrease one or more problems associated with one or more of the existing folding rotor blades and/or methods of deployment thereof.

SUMMARY

In one aspect of the disclosure, a folding rotor blade for an autogyro device comprises a plurality of connected rotor members. When the folding rotor blade is in a compressed state the folding rotor blade has a compressed length and some of the connected rotor members are disposed in a non-parallel arrangement. When the folding rotor blade is in an extended state the folding rotor blade has an extended length which is greater than the compressed length and the connected rotor members are disposed in a parallel arrangement.

In another aspect of the disclosure, a folding rotor blade for an autogyro device comprises a plurality of rotor members which are connected by hinges. The folding rotor blade is adapted to move as a result of centrifugal force from a compressed state having a compressed length to an extended state having an extended length greater than the compressed length.

In still another aspect of the disclosure, a method of deploying a folding rotor blade attached to an autogyro device is disclosed. In one step, the folding rotor blade attached to the autogyro device is provided. The folding rotor blade comprises a plurality of connected rotor members. In another step, the folding rotor blade is compressed to a compressed length in which some of the connected rotor members are disposed in a non-parallel arrangement. In yet another step, the folding rotor blade is extended to an extended length, which is greater than the compressed length, in which the connected rotor members are disposed in a parallel arrangement as a result of centrifugal force.

These and other features, aspects and advantages of the disclosure will become better understood with reference to the following drawings, description and claims.

BRIEF DESCRIPTION OF THE DRAWINGS

FIG. 3A shows a cross-sectional view along line 3A-3A of the embodiment of FIG. 3;

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
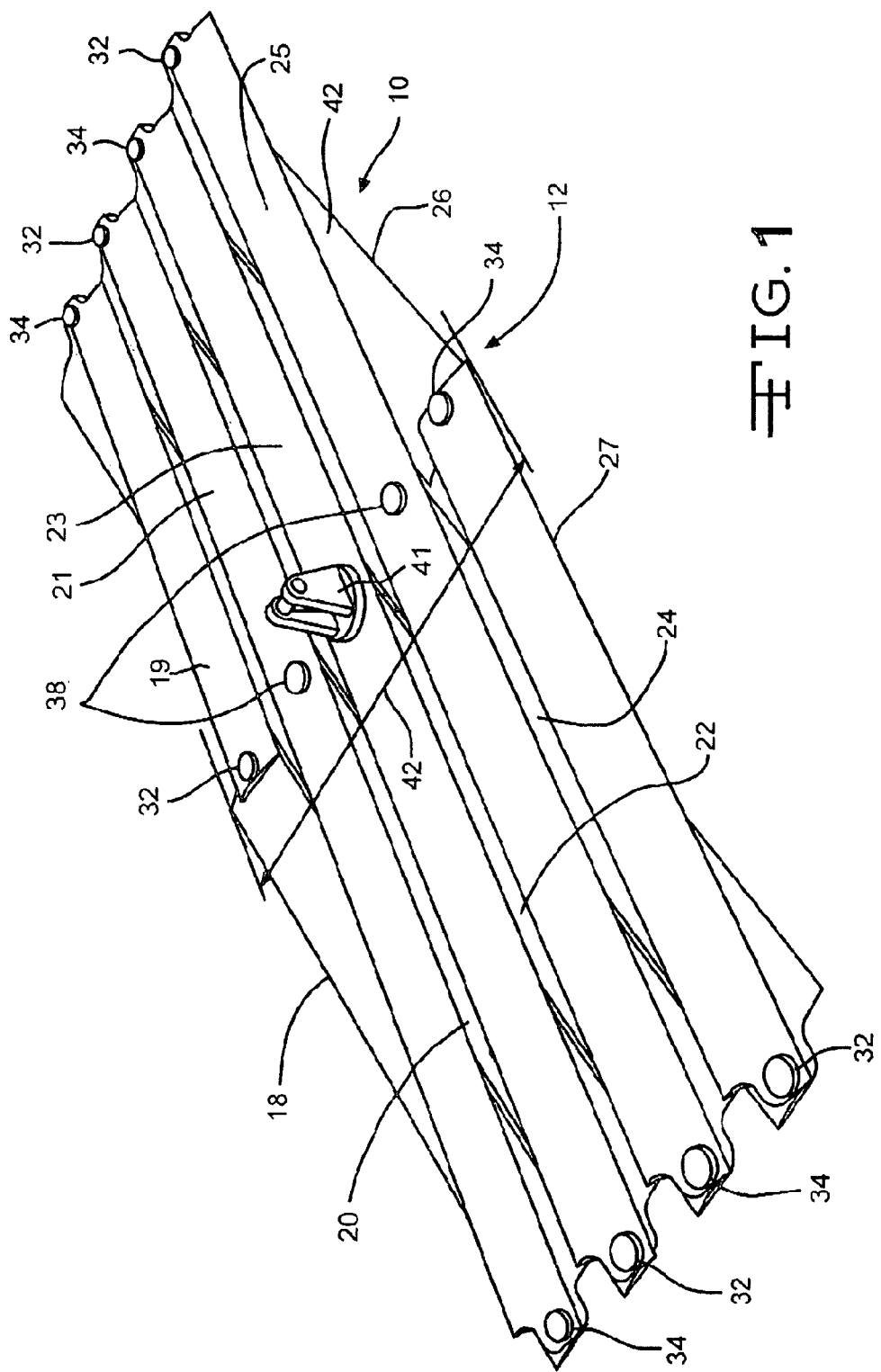
FIG. 1 shows a top perspective view of an embodiment of a folding rotor blade in a compressed state.
Figure 2:
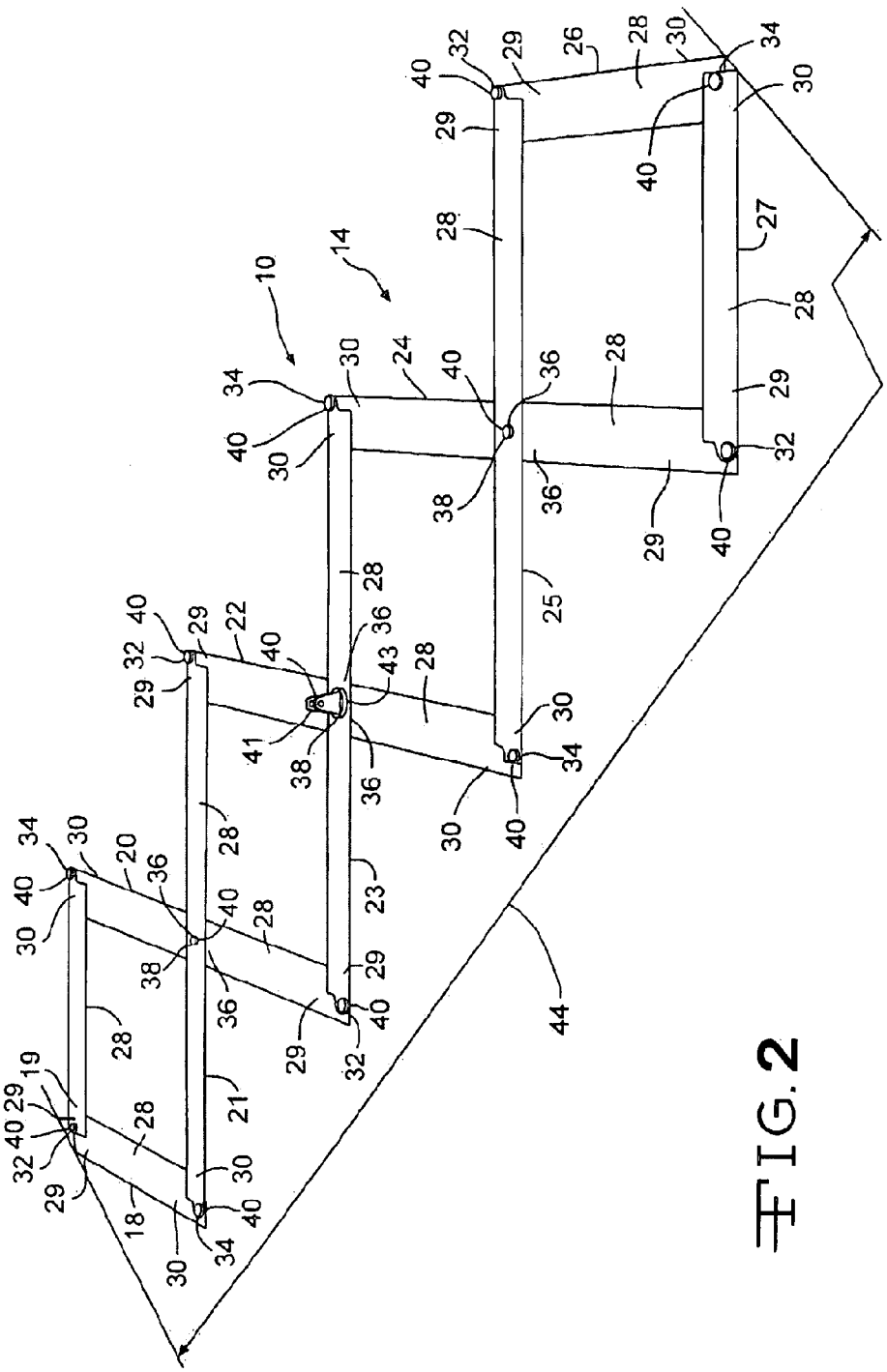
FIG. 2 shows a top perspective view of the embodiment of the folding rotor blade of FIG. 1 in an intermediate state.
Figure 3:
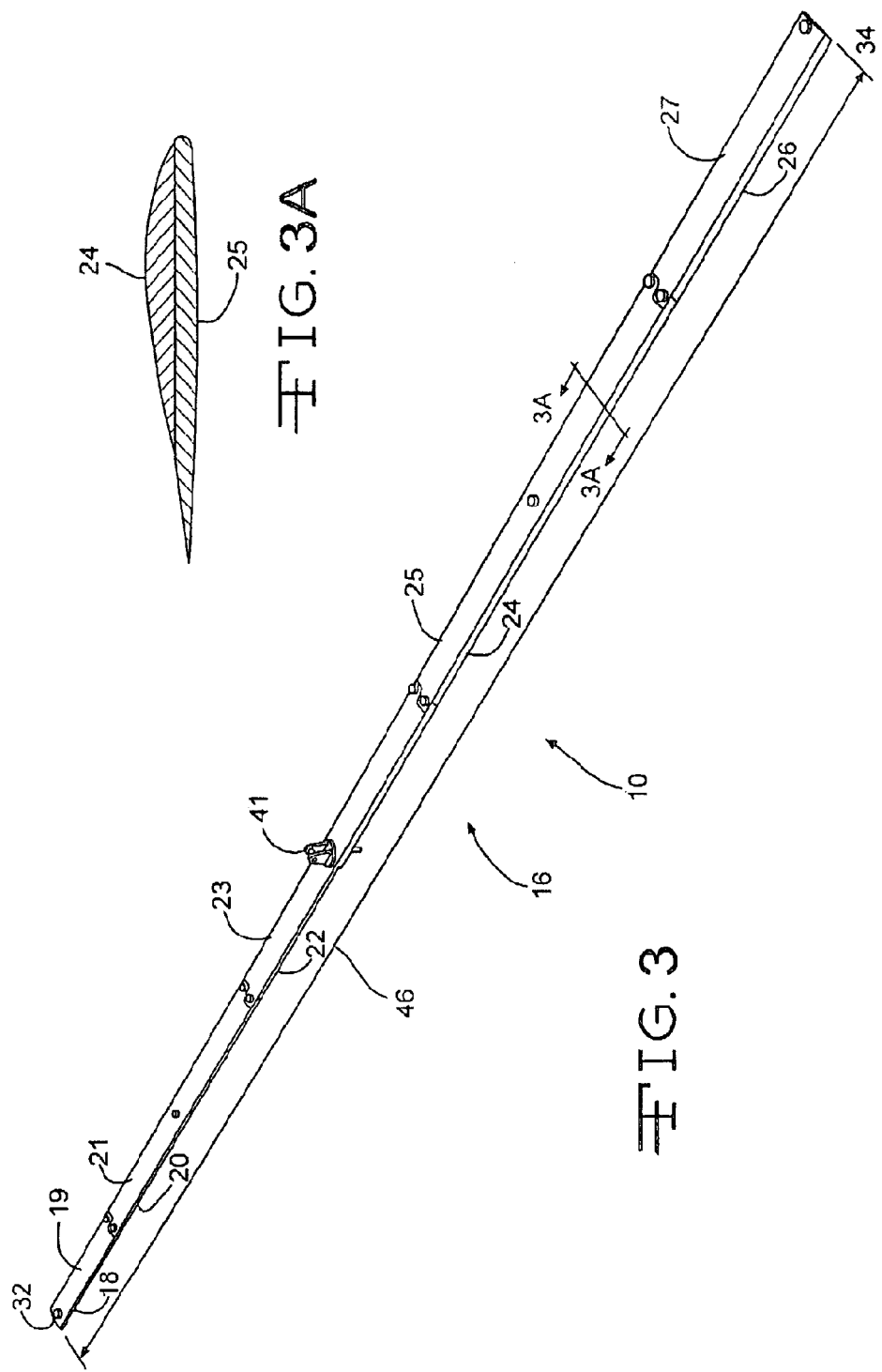
FIG. 3 shows a top perspective view of the embodiment of the folding rotor blade of FIG. 1 in an extended state.

FIGS. 1-3 show top perspective views of the same embodiment of a folding rotor blade 10 in a compressed state 12 as shown in FIG. 1, an intermediate state 14 as shown in FIG. 2, and an extended state 16 as shown in FIG. 3. As best seen in FIG. 2, the folding rotor blade 10 may comprise a plurality of rectangular connected rotor members 18-27 which each may be made of a composite or metal such as aluminum. The connected rotor members 18-27 may each have solid cross-sections 28. In other embodiments, the connected rotor members 18-27 may be of other materials, shapes, sizes, configurations, orientations, and/or have varying cross-sections 28. Each of the ends 29 and 30 of each rotor member 18-27 may be connected to respective ends 29 and 30 of another rotor member 18-27 at hinges 32 and 34. The mid-section 36 of each inner rotor member 20-25 may be connected to another mid-section 36 of another inner rotor member 20-25 at each of hinges 38. Each of the hinges 32, 34, and 38 may comprise pin members 40 which bolt separate rotor members 18-27 together to allow the rotor members 18-27 to rotate relative to one another. In other embodiments, varying connection mechanisms may be utilized to connect the rotor members 18-27 together. An attachment member 41, for attaching to an autogyro device, may be attached to a center section 43 of rotor member 23.

Due to the hinges 32, 34, and 38, the folding rotor blade 10 may move from the compressed state 12 of FIG. 1 having a compressed length 42, to the intermediate state 14 of FIG. 2 having an intermediate length 44, to the extended state 36 of FIG. 3 having an extended length 46. In the compressed state 12 of FIG. 1, some of the connected rotor members 18, 20, 22, 24, and 26 may be disposed in a non-parallel arrangement with respect to other of the connected rotor members 19, 21, 23, 25, and 27. Conversely, while in the compressed state 12, the connected rotor members 18, 20, 22, 24, and 26 may be disposed in a parallel arrangement with respect to one another. Similarly, in the compressed state 12, the connected rotor members 19, 21, 23, 25, and 27 may also be disposed in a parallel arrangement with respect to one another.

As the folding rotor blade 10 moves from its compressed state 12 of FIG. 1 to its intermediate state 14 of FIG. 2, each of the connected rotor members 18-27 may rotate relative to one another about hinges 32, 34, and 38 to allow the folding rotor blade 10 to move from its compressed length 42 to its greater intermediate length 44. As the folding rotor blade 10 moves from its intermediate state 14 of FIG. 2 to its extended state 16 of FIG. 3, each of the connected rotor members 18-27 may continue to rotate relative to one another about hinges 32, 34, and 38 to allow the folding rotor blade to move from its intermediate length 44 to its greatest extended length 46. In the extended state 16 of FIG. 3, each of the connected rotor members 18-27 may be disposed in a parallel arrangement relative to one another and together form a rotor blade with an airfoil cross-section. FIG. 3A shows a cross-sectional view through line 3A-3A of the embodiment of FIG. 3. As shown, the rotor members 24 and 25 may form an airfoil shape.

Figure 4:
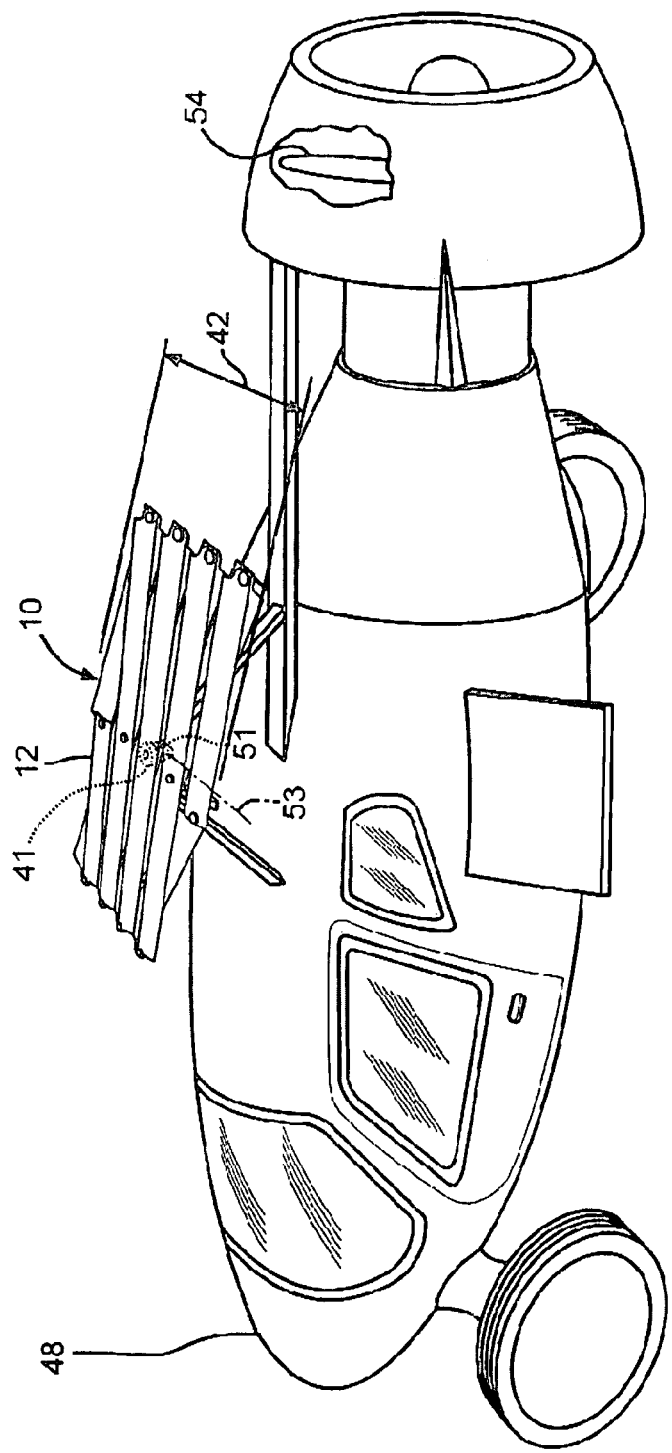
FIG. 4 shows an isometric view of the folding rotor blade of the embodiment of FIG. 1 attached to an autogyro device with the folding rotor blade in a compressed state.
Figure 5:
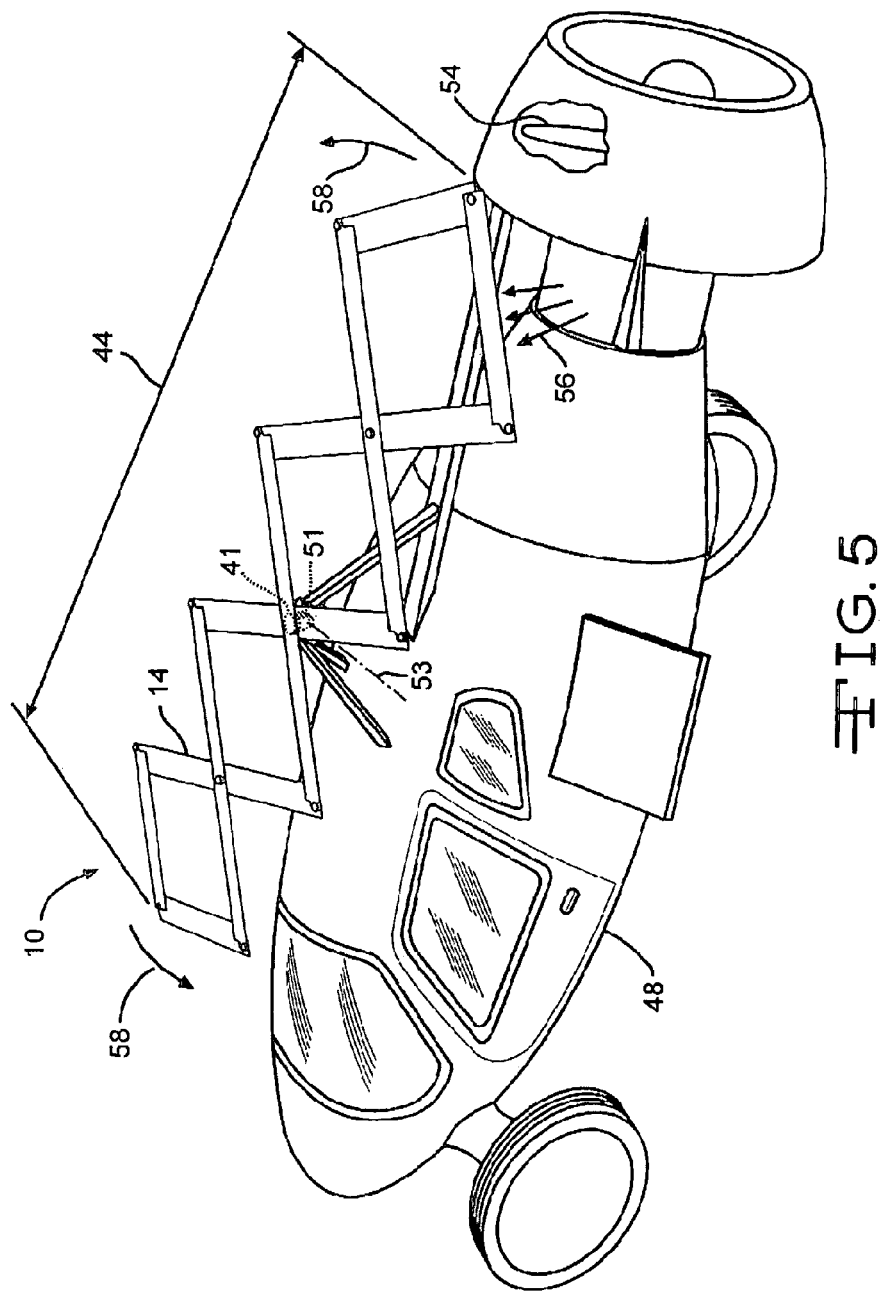
FIG. 5 shows an isometric view of the folding rotor blade of the embodiment of FIG. 1 attached to the autogyro device of FIG. 4 with the folding rotor blade in an intermediate state.
Figure 6:
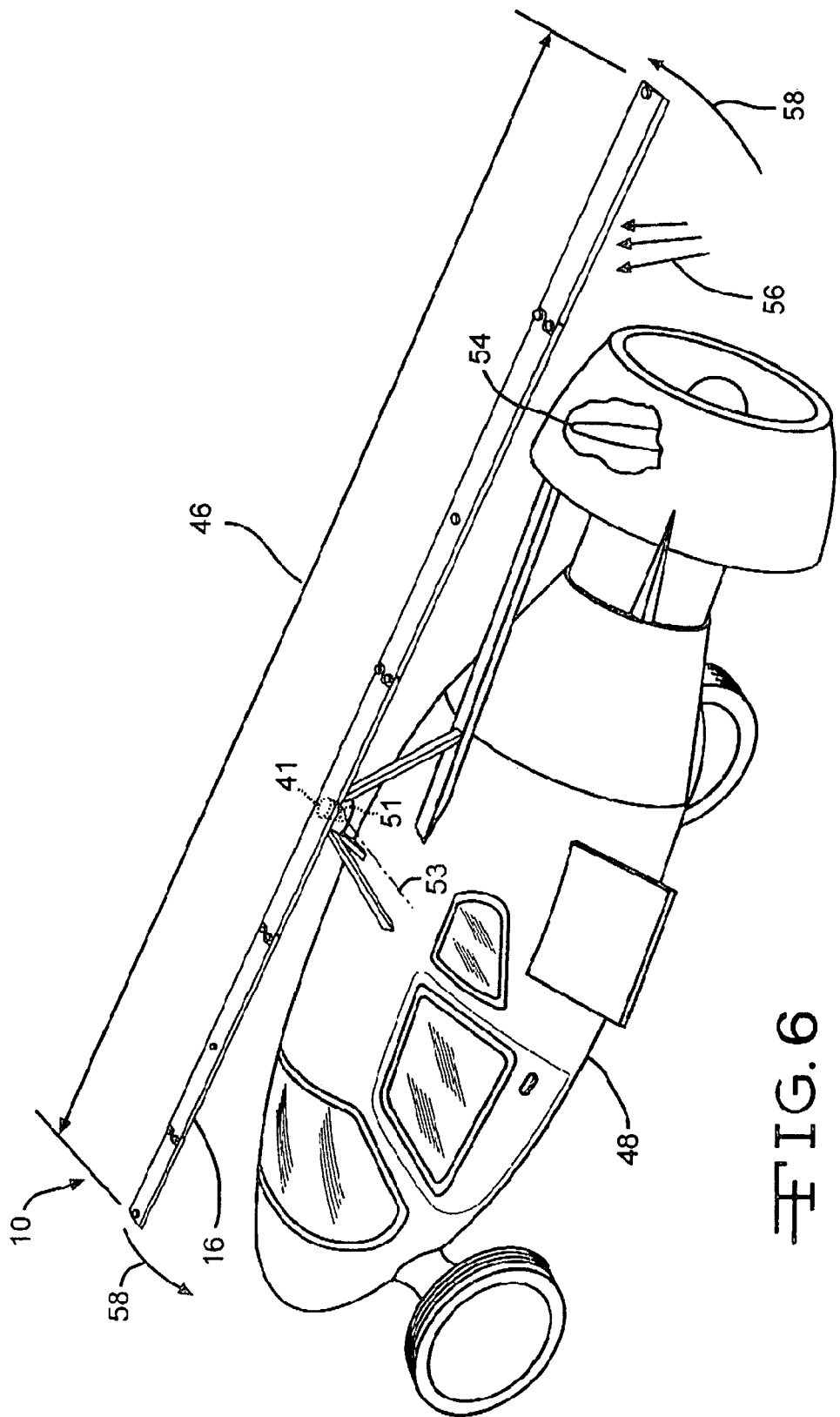
FIG. 6 shows an isometric view of the folding rotor blade of the embodiment of FIG. 1 attached to the autogyro device of FIG. 4 with the folding rotor blade in a compressed state.

FIGS. 4-6 show isometric views of the folding rotor blade 10 of the embodiment of FIGS. 1-3 attached to an autogyro device 48 with the folding rotor blade 10 in a compressed state 12 having a compressed length 42 as shown in FIG. 4, an intermediate state 14 having an intermediate length 44 as shown in FIG. 5, and an extended state 16 having an extended length 46 as shown in FIG. 6. The autogyro device 48 may comprise a helicopter, a vehicle, an airdrop device, or other type of autogyro device. The folding rotor blade 10 may be attached to the autogyro device 48 by attaching the attachment member 41 of the folding rotor blade 10 to the shaft 51 of the autogyro device 48. The shaft 51 of the autogyro device 48 may not be powered during flight. The folding rotor blade 10 may be free to rotate about a teetering axis 53 along the shaft 51 to account for differing aerodynamic loads in the advancing and retreating rotor blade during flight.

As shown in FIG. 4, when the autogyro device 48 is not operating, the folding rotor blade 10 may be in its compressed state 12 due to spring loading of the folding rotor blade 10 thereby biasing the folding rotor blade 10 into the compressed state 12. In its compressed state 12, the folding rotor blade 10 may fit within an envelope of approximately 7.5 feet by 4 feet by 1 inch, which may allow the autogyro device 48 to fit on a road-able vehicle. As shown in FIG. 5, when the autogyro device 48 begins to operate, the rotor blade 10 may be rotated by a pre-spinning motor (not shown). The centrifugal force generated by the rotor spin may force the folding rotor blade 10 to begin to rotate thereby creating centrifugal force 58 on the folding rotor blade 10 causing the folding rotor blade 10 to move from its compressed state 12 of FIG. 4 to its longer intermediate state 14 of FIG. 5.

As shown in FIG. 6, as the autogyro device 48 continues to operate and the pre-spinning motor rotates faster, the centrifugal force 58 on the folding rotor blade 10 may increase thereby causing the folding rotor blade 10 to move from its intermediate state 14 of FIG. 5 to its longest extended state 16 of FIG. 6. In extended state 16, the folding rotor blade 10 may be fully extended. With forward velocity generated by the propeller 54, the rotor spin is maintained due to aerodynamic forces from upflow of air 56 through the rotor blade 10. This rotor spin maintains the folding rotor blade 10 in its extended state 16 throughout the vehicle flight. The pre-spinning motor is disengaged from the rotor blade 10 during flight, and the autogyro device 48 may take off from the ground due to the lift from the rotating rotor blade 10. In its extended state 16, the folding rotor blade 10 may be a NASA 8H12 airfoil with an eight inch chord (approximately 1" thick) and a diameter of thirty feet. When the autogyro device 48 eventually lands on the ground, the propeller 54 may stop spinning thereby stopping the vehicle. When upflow through the rotor is eliminated, the folding rotor blade 10 may stop rotating. The folding rotor blade 10 may then compress into its compressed state 12 as a result of the spring loading of the folding rotor blade 10.

Figure 7:
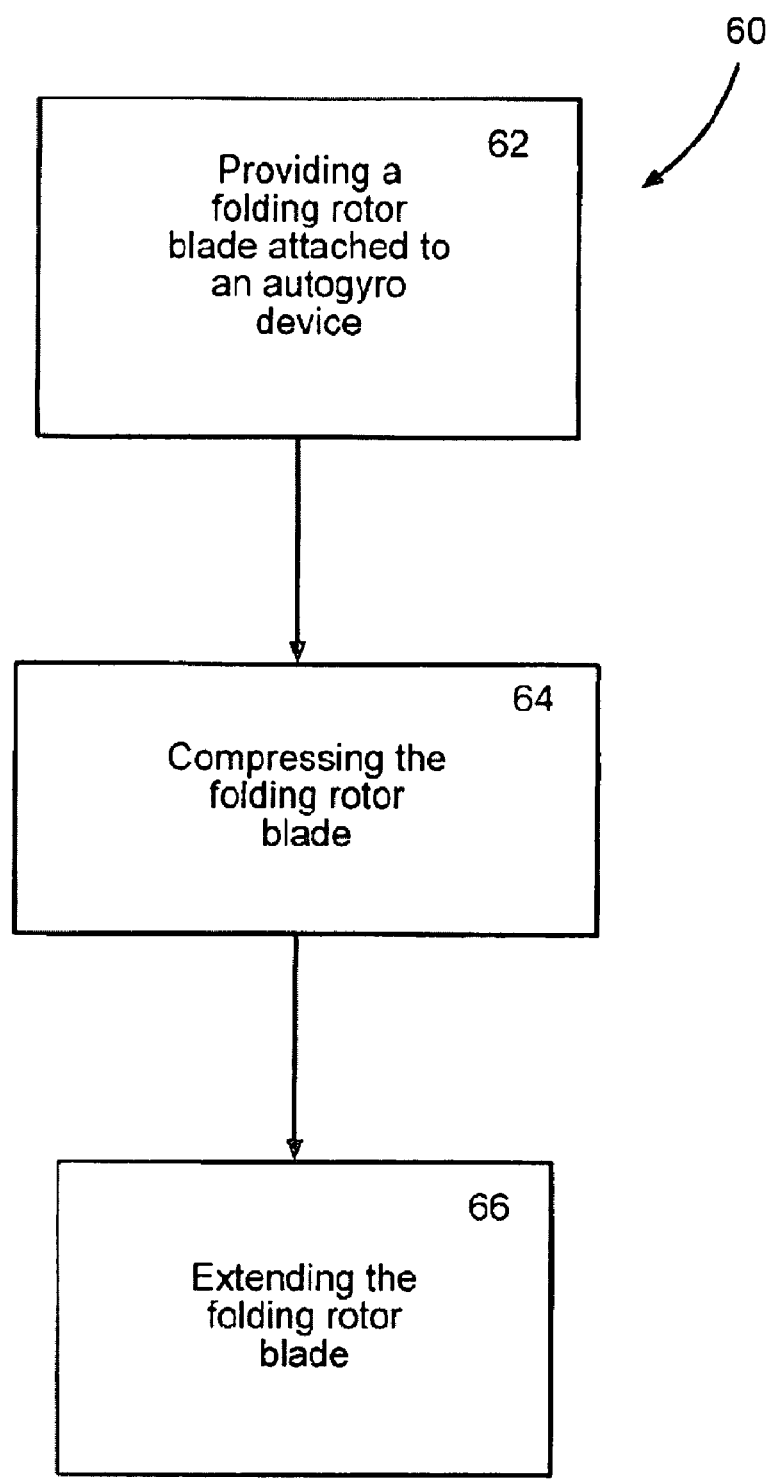
FIG. 7 shows a flowchart of one embodiment of a method of deploying a folding rotor blade attached to an autogyro device.

FIG. 7 shows a flowchart of one embodiment of a method 60 of deploying a folding rotor blade 10 attached to an autogyro device 48. The autogyro device 48 may comprise at least one of a helicopter, a vehicle, and an airdrop device. In one step 62, a folding rotor blade 10 is provided attached to the autogyro device 48. The folding rotor blade 10 may comprise a plurality of connected rotor members 18-27 which may have solid cross-sections 28, may be rectangular, and may be made of a composite or metal such as aluminum. The connected rotor members 18-27 may be connected to one another by hinges 32, 34, and 38 comprising pin members 40.

In another step 64, the folding rotor blade 10 may be compressed to a compressed length 42 in which some of the connected rotor members 18, 20, 22, 24, and 26 are disposed in a non-parallel arrangement with respect to other connected rotor members 19, 21, 23, 25, and 27. During step 64, the folding rotor blade 10 may be compressed so that connected rotor members 18, 20, 22, 24, and 26 are disposed in a parallel arrangement relative to one another, and connected rotor members 19, 21, 23, 25, and 27 are similarly disposed in a parallel arrangement relative to one another. The folding rotor blade 10 may be spring loaded to compress the folding rotor blade 10 when the autogyro device 48 is not operating. In yet another step 66, the folding rotor blade 10 may be extended to an extended length 45, which is greater than the compressed length 42, in which the connected rotor members 18-27 are disposed in a parallel arrangement as a result of centrifugal force 58 supplied by the autogyro device 48.

One or more embodiments of the disclosure may reduce and/or eliminate one or more problems of one or more of the existing rotor blade devices for an autogyro device and/or methods of deployment. For instance, one or more embodiments of the disclosure may provide a means of automatically deploying a folding rotor blade with a relatively simple mechanism; may reduce the length of the folding rotor blade when stowed to fit within a road-able vehicle; may provide means of automatically stowing the folding rotor blade; may maintain balance during deployment and stowage of the folding rotor blade; and in its extended configuration may provide for the use of a similar solid, air-foil, cross-section manufactured rotor blade as currently used in other devices.

It should be understood, of course, that the foregoing relates to exemplary embodiments of the disclosure and that modifications may be made without departing from the spirit and scope of the disclosure as set forth in the following claims.

The invention claimed is:
1. A folding rotor blade for an autogyro device comprising:
a plurality of connected rotor members, wherein when the folding rotor blade is in a compressed state the folding rotor blade has a compressed length and some of the connected rotor members are disposed in a non-parallel arrangement, and when the folding rotor blade is in an extended state the folding rotor blade has an extended length which is greater than the compressed length and the connected rotor members are disposed in a parallel arrangement;
wherein at least one of: (1) the folding rotor blade is spring loaded to move the folding rotor blade into the compressed state when an autogyro device is not operating; or (2) the folding rotor blade is adapted to move to the extended state from the compressed state as a result of centrifugal force supplied by an autogryo device.

2. The folding rotor blade of claim 1 wherein the folding rotor blade is for an autogyro device comprising at least one of a helicopter, a vehicle, or an airdrop device.

3. The folding rotor blade of claim 1 wherein the connected rotor members have solid cross-sections.

4. The folding rotor blade of claim 1 wherein the connected rotor members are made of at least one of a composite or a metal.

5. The folding rotor blade of claim 1 wherein the plurality of connected rotor members are connected by hinges comprising pin members.

6. The folding rotor blade of claim 1 wherein when the folding rotor blade is in the compressed state some other of the connected rotor members are disposed in a parallel arrangement.

7. The folding rotor blade of claim 1 wherein the folding rotor blade is spring loaded to move the folding rotor blade into the compressed state when an autogyro device is not operating.

8. The folding rotor blade of claim 1 wherein the folding rotor blade is adapted to move to the extended state from the compressed state as a result of centrifugal force supplied by an autogryo device.

9. A folding rotor blade for an autogyro device comprising:
a plurality of rotor members which are connected by hinges, wherein the folding rotor blade is adapted to move as a result of centrifugal force from a compressed state having a compressed length to an extended state having an extended length greater than the compressed length;
wherein at least one of: (1) the connected rotor members have solid cross-sections; (2) when the folding rotor blade is in the compressed state some of the connected rotor members are disposed in a non-parallel arrangement, and when the folding rotor blade is in the extended state the connected rotor members are disposed in a parallel arrangement; or (3) the folding rotor blade is spring loaded to move the folding rotor blade into the compressed state when an autogyro device is not operating.

10. The folding rotor blade of claim 9 wherein the folding rotor blade is for an autogyro device comprising at least one of a helicopter, a vehicle, or an airdrop device.

11. The folding rotor blade of claim 9 wherein the connected rotor members have the solid cross-sections.

12. The folding rotor blade of claim 9 wherein the connected rotor members are made of at least one of a composite or a metal.

13. The folding rotor blade of claim 9 wherein the hinges comprise pin members.

14. The folding rotor blade of claim 9 wherein when the folding rotor blade is in the compressed state some of the connected rotor members are disposed in the non-parallel arrangement, and when the folding rotor blade is in the extended state the connected rotor members are disposed in the parallel arrangement.

15. The folding rotor blade of claim 9 wherein when the folding rotor blade is in the compressed state some other of the connected rotor members are disposed in a parallel arrangement.

16. The folding rotor blade of claim 9 wherein the folding rotor blade is spring loaded to move the folding rotor blade into the compressed state when an autogyro device is not operating.

17. The folding rotor blade of claim 9 wherein the folding rotor blade is adapted to move to the extended state from the compressed state as a result of centrifugal force supplied by an autogryo device.

18. A method of deploying a folding rotor blade attached to an autogyro device comprising:
providing the folding rotor blade attached to the autogyro device, wherein the folding rotor blade comprises a plurality of connected rotor members;
compressing the folding rotor blade to a compressed length in which some of the connected rotor members are disposed in a non-parallel arrangement; and
extending the folding rotor blade to an extended length, which is greater than the compressed length, in which the connected rotor members are disposed in a parallel arrangement as a result of centrifugal force.

19. The method of claim 18 wherein the autogyro device comprises at least one of a helicopter, a vehicle, or an airdrop device.

20. The method of claim 18 wherein the connected rotor members have solid cross-sections.

21. The method of claim 18 wherein the connected rotor members are made of at least one of a composite or a metal.

22. The method of claim 18 wherein the plurality of connected rotor members are connected by hinges comprising pin members.

23. The method of claim 18 wherein when the folding rotor blade is compressed some other of the connected rotor members are disposed in a parallel arrangement.

24. The method of claim 18 wherein the folding rotor blade is spring loaded to compress the folding rotor blade when the autogyro device is not operating.

25. The method of claim 18 wherein the folding rotor blade extends as a result of centrifugal force supplied by the autogryo device.

\* \* \* \* \*